Jan. 24, 1961

D. J. CAPUANO 2,969,179

INTERCEPT COURSE CALCULATOR

Filed Nov. 15, 1957

INVENTOR.
DOMINICK J. CAPUANO
BY
Lawrence S. Epstein
ATTORNEYS

Jan. 24, 1961     D. J. CAPUANO     2,969,179
INTERCEPT COURSE CALCULATOR
Filed Nov. 15, 1957                                 2 Sheets-Sheet 2

INVENTOR.
DOMINICK J. CAPUANO
BY J. A. O'Connell
Lawrence S. Epstein
ATTORNEYS

United States Patent Office 2,969,179
Patented Jan. 24, 1961

2,969,179

INTERCEPT COURSE CALCULATOR

Dominick J. Capuano, Plainview, N.Y., assignor, by mesne assignments, to the United States of America as represented by the Secretary of the Navy Filed Nov. 15, 1957, Ser. No. 696,891

4 Claims. (Cl. 235—78)

This invention relates to calculating devices and especially to a calculating device capable of rapidly providing the bearing for the shortest possible interception path between a moving target and an interceptor.

The problem of intercepting a moving target is constantly presented to military craft such as aircraft and naval vessels. The problem resolves itself into finding the shortest possible path to be taken by the intercepting vehicle in view of the initial positions of the two vehicles, the speed and course of the target and the interception speed of the interceptor (usually its maximum speed).

The problem may be empirically solved through a series of visual estimates of the proper course made at intervals by the pilot of the interceptor or it may be mathematically resolved by trigonometrically calculating the proper interception course.

The empirical solution usually does not result in the shortest possible course and the mathematical solution usually involves excessive time which, in this age of jet aircraft, may result in missing the opportunity for an interception. The present invention aids in decreasing the time required to obtain the solution to the trigonometric intercept problem.

The objects and advantages of the present invention are accomplished by precalculating the intercept problem solutions for a predetermined range of target speeds and a specific intercept speed and inscribing these solutions at the proper locations upon a circular mechanical device which is arranged so that the known factors in the intercept problem may be set up on the device and the unknown solution may be quickly located.

A preferred embodiment of the invention comprises a calculating device consisting of a flat disc having an inner disc-like section and an adjacent concentric outer ring section, the two sections being rotatable with respect to each other. The inner disc bears radial lines spaced at equal angular distances from each other and spaced circles arranged concentrically around the central axis of the disc, each circle representing a different target speed. The angular values of the radial lines are marked as a scale along one periphery of the outer ring and an identical set of angular value markings, displaced 180 degrees from the first, is located along the other periphery of the outer ring.

The zero-180 degree radial line or diameter of the inner disc is identifiably marked by means of an arrow and the solutions to the trigonometric intercept problem are inscribed at their proper points, which are the intersections of the target-speed concentric circles and the radial bearing lines. These solutions are mathematically precalculated for various specific values in an assumed range of target speeds, a specific interceptor speed and a plurality of angles between the target course and the target-interceptor relative bearing line, these various specific values of target speed and the plurality of angles being indicated on the calculator disc. Thus, knowledge of the target course and speed and the relative bearing between the target and interceptor positions permits an immediate selection of the proper solution to the intercept problem from the information inscribed upon the inner section of the calculator disc.

An object of this invention is to provide a means whereby the shortest possible intercept path may be quickly determined when the speeds of a target and interceptor vehicle, the course of the target and the relative bearing between the target and interceptor positions are known.

A further object is to provide a device for determining the shortest possible intercept path between a target and interceptor vehicle which eliminates the necessity for trigonometric computation.

Other objects and many of the attendant advantages of this invention will be readily appreciated as the same becomes better understood by reference to the following detailed description when considered in connection with the accompanying drawings wherein.

In order to explain the construction and operation of the present invention, the problem which it solves should be explained. Thus, Fig. 1 illustrates in schematic form the trigonometric problem which must be solved in order to provide an interceptor aircraft with the proper bearing to enable it to intercept a target aircraft by the shortest possible path.

Figure 1:
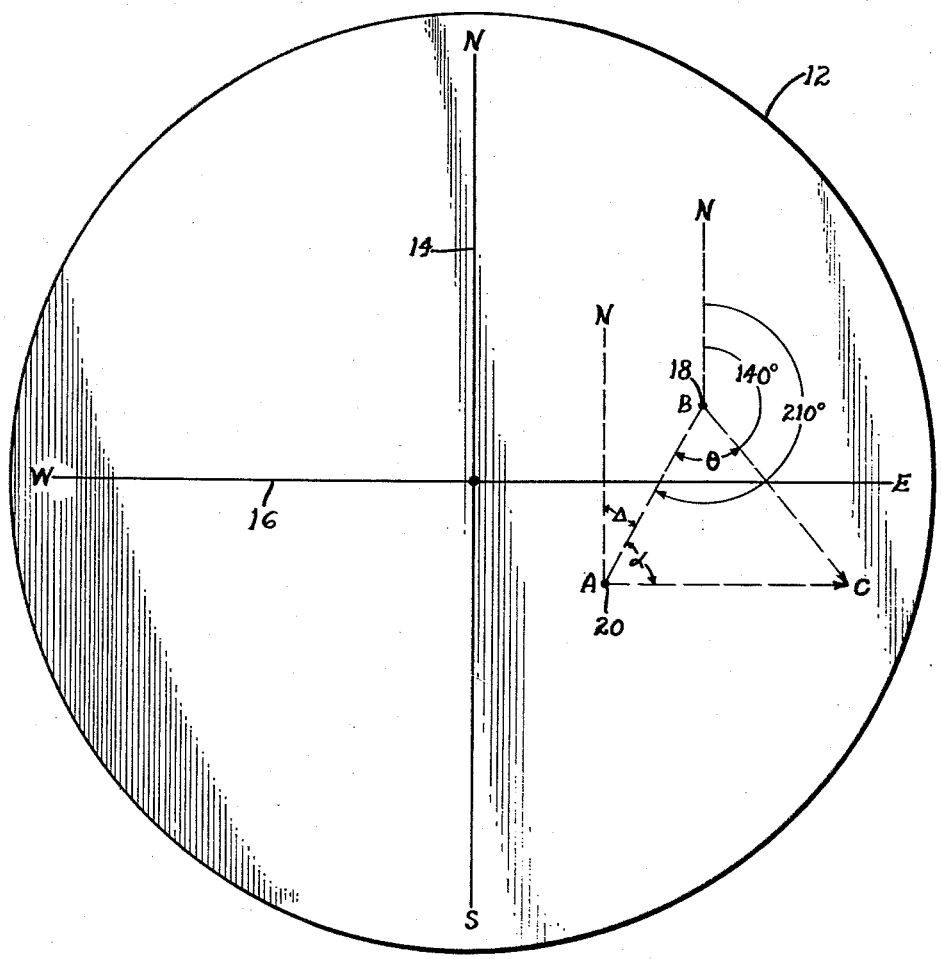
Fig. 1 is a schematic representation of the factors involved in the trigonometric intercept problem.

Fig. 1 shows the scope 12 of a radar which may be employed to obtain the values of some of the factors involved in the trigonometric intercept problem. The face of the scope 12 has inscribed upon it north-south (14) and east-west (16) direction lines. The scope 12 also shows two dots of light, one being a target aircraft 18 at B and the other being an interceptor aircraft 20 at A. The other lines and symbols appearing in Fig. 1 do not actually appear on the radar scope but are included to assist in explaining the problem.

From prior observation of the target 18, its course bearing (BC) and its speed ($S_T$) are known. Also known are the maximum interception speed ($S_I$) of the interceptor 20 and the bearing (BA) between the target 18 and the interceptor 20. From these known values, the angle $\alpha$ can be calculated. Knowing $\alpha$, the course bearing (AC) which the interceptor 20 must fly to intercept the target 18 by the shortest possible path is determined. The course bearing is $\Delta$ plus $\alpha$ (or $\Delta$ minus $\alpha$, in some cases).

$\alpha$ can be calculated from the trigonometric law of sines:

$$\frac{BC}{\sin \alpha} = \frac{AC}{\sin \theta}$$

The speeds of the target and interceptor aircraft can be substituted for the distances BC and AC since the time of flight from B and A to C is the same in both cases. Thus, $$\frac{S_T}{\sin \alpha} = \frac{S_I}{\sin \theta} \text{ and } \sin \alpha = \sin \theta \frac{S_T}{S_I}$$

Figure 2:
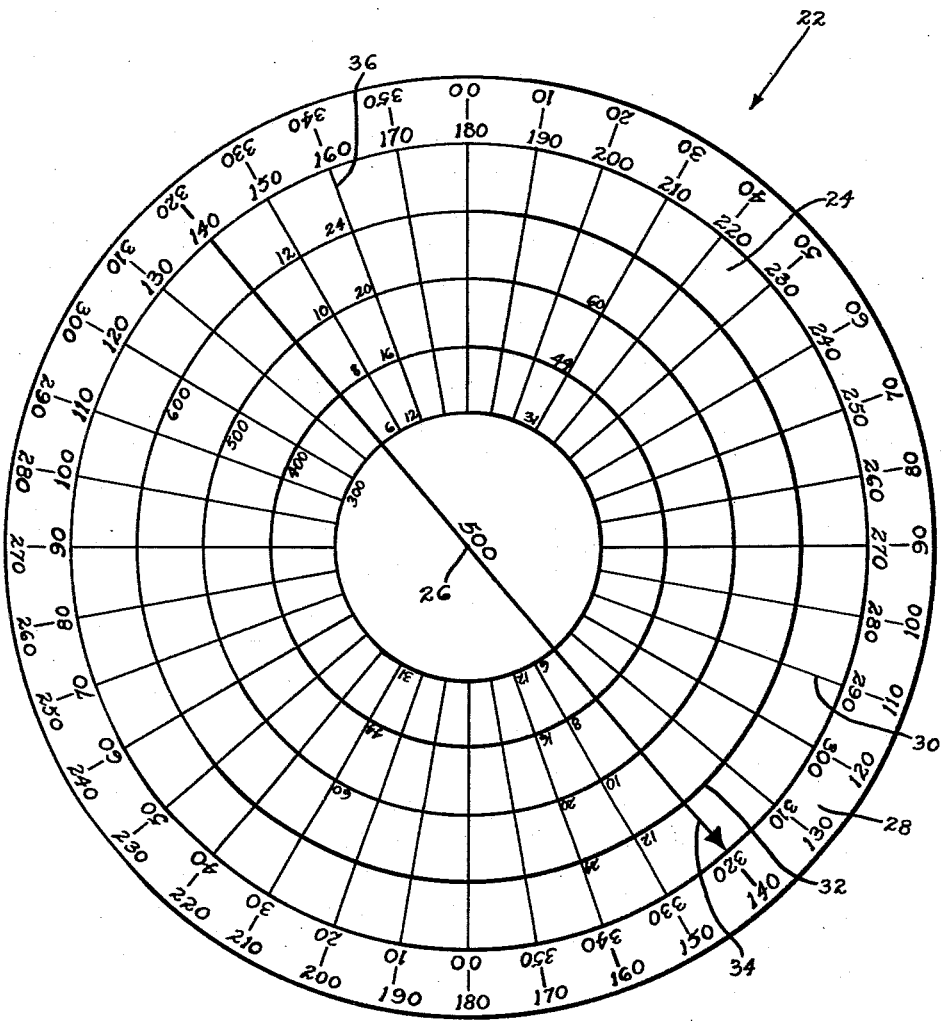
Fig. 2 is a plan view of an embodiment of the invention.

The vector calculator shown in Fig. 2 carries the solutions for this equation imprinted upon its face so that a person knowing the target speed, the target course bearing and the bearing between the target and the interceptor can immediately obtain the interception course bearing.

The calculator 22 consists of two parts, an inner disc 24 rotatable about a central axis 26 and an outer circular rim 28 which is centered on the same axis 26 and is fixed in position with respect to the axis 26. (Of course, the rim 28 may be made rotatable and the inner disc 24 held stationary.)

The rim 28 and inner disc 24 are marked with radially extending lines 30 at 10° intervals. A number of concentric circles 32 are also inscribed on the inner disc 24, the circles 32 corresponding to the speeds of targets which might be encountered (300 to 600 knots per hour in this case). The intersections of the radial lines 30 and the concentric circles 32 are marked with precalculated values of α for the θ value represented by the associated radial line and for the target speed represented by the associated concentric circle. It should be noted here that each particular calculator 22 is designed for a specific interceptor aircraft with a predetermined maximum speed (the speed of interception) which is preferably marked in the central portion of the disc 24 (in this case the maximum speed is 500 knots per hour). The zero–180 degree radial line of the inner disc 24 is marked by an arrow 34. The intersections of the 20° radial line 36 and the 300, 400, 500 and 600 knot per hour concentric circles are marked with α values of 12, 16, 20 and 24 degrees, respectively. Only a few α values are shown in Fig. 2.

There are two sets of angular values inscribed upon the rim 28. The set around the outer periphery represents the target course bearings and the set around the inner periphery represents the angle Δ which must be added to α for any value of θ in order to obtain the interceptor course bearing from north.

In using the calculator 22, the target 18 may be considered to be at the center of the inner disc 24 and the arrowheaded half of the zero degree radial line may be considered to be the target course bearing line BC. Thus, in solving the following problem where the target course bearing is 140°, the bearing of the interceptor is 210° and the target speed is 400 knots per hour, the inner disc 24 is rotated so that the arrow 34 points to 140° on the outer periphery of the rim 28. The person operating the calculator 22 then looks along the radial line extending inwardly from the 210° mark and finds that for a θ of this value (210°–140°), the value of α is 44° and the value of Δ is 30°. The interceptor course bearing is therefore 74° (α+Δ).

One further aspect of the inner disc 24 remains to be explained. It will be noted that the inner disc is divided into two similar halves by the zero–180° radial line. The α values on the other half of the disc 24 (the half not employed in the illustrative problem) must be subtracted from the Δ values on the rim 28 to obtain the proper intercept bearings when the relative bearing between the target and interceptor happens to be of smaller value than the target course bearing.

Obviously many modifications and variations of the present invention are possible in the light of the above teachings. It is therefore to be understood that within the scope of the appended claims the invention may be practiced otherwise than as specifically described.

I claim:

1. A calculator for supplying the intercept course bearing to be taken by an interceptor vehicle in order to intercept a target vehicle by the shortest possible path comprising, in combination, a disc and a ring encircling said disc, said disc and ring being rotatable relative to one another, said disc bearing concentric circles each marked with a different predetermined target speed, said disc further bearing radial lines at equal angular spacings, the angular values being marked along one periphery of said ring and a second set of identical angular values displaced 180 degrees from the first set being marked along the other periphery of said ring, the zero degree radial line on said disc being identifiably marked and the intersections of said radial lines and said concentric circles being marked with precalculated angular values indicating the angle between the line connecting the present positions of the target and interceptor vehicles and the locus representing the shortest possible intercept course as determined from the equation relating said angle with the speeds of the target and interceptor vehicles and the angle between the target course and the line connecting the present target and interceptor positions.

2. A calculator for supplying the intercept course bearing to be taken by an interceptor vehicle in order to intercept a target vehicle by the shortest possible path comprising, in combination, a disc and a ring encircling said disc, said disc and ring being rotatable relative to one another, said disc bearing concentric circles each marked with a different predetermined target speed, said disc further bearing radial lines at equal angular spacings, the angular values being marked along the outer periphery of said ring, said ring bearing a second set of angular values marked along its inner periphery, said inner set of angular values being the same as said outer set but displaced 180° from said outer set, the zero degree radial line on said disc being identifiably marked and the intersections of said radial lines and said concentric circles being marked with precalculated angular values indicating the angle between the line connecting the present positions of the target and interceptor vehicles and the locus representing the shortest possible intercept course as determined from the equation relating said angle with the speeds of the target and interceptor vehicles and the angle between the target course and the line connecting the present target and interceptor positions.

3. A calculator for supplying the intercept course bearing to be taken by an interceptor vehicle in order to intercept a target vehicle by the shortest possible path comprising, in combination, a disc and a ring encircling said disc, said disc and ring being rotatable relative to one another, said disc bearing concentric circles each marked with a different predetermined target speed, said disc further bearing radial lines at equal angular spacings, the angular values being marked along one periphery of said ring and a second set of identical angular values displaced 180° from the first set being marked along the other periphery of said ring, the zero degree radial line on said disc being identifiably marked and the intersections of said radial lines and said concentric circles being marked with precalculated angular values indicating the angle ($\alpha$) between the line connecting the present positions of the target and interceptor vehicles and the locus representing the shortest possible intercept course as determined from the following equation where $\theta$ is the angle between the target course bearing and the bearing of the line connecting the present positions of the target and interceptor vehicles, $S_T$ is the present speed of the target vehicle and $S_I$ is the interception speed of the interceptor vehicle, $\theta$, $S_T$ and $S_I$ being known values:

$$\sin \alpha = \sin \theta \frac{S_T}{S_I}$$

4. A device for providing solutions to the trigonometric problem of determining the shortest possible path which movable body A must travel to intercept moving body B when the intercept speed of A, the speed and course bearing of B and the bearing of the line connecting the present positions of A and B are known, the solutions presented by said device lying in a range determined by assuming a specific range of speeds for moving body B and a specific intercept speed for moving body A, said device comprising, in combination, a disc and a ring encircling said disc, said disc and ring being rotatable relative to each other, said disc bearing concentric circles each representing a different speed of moving body B within the assumed range of speeds for B, said disc further bearing radial lines at equal angular spacings, the angular value of each radial line being marked along one periphery of said ring as a scale and a second scale of identical angular values displaced 180° from the first being marked along the other periphery of said ring, the zero-degree radial line being marked for easy identification and the intersections of said radial lines and said concentric circles being marked with precalculated angular values indicating the angle between the line connecting the present positions of A and B and the locus representing the shortest possible intercept course for A, said second set of angular values on said ring providing a value at each radial line which must be algebraically combined with the precalculated angular values along the intersections of said radial line to obtain the intercept course bearing from north.

References Cited in the file of this patent

UNITED STATES PATENTS

| | | |
|---|---|---|
| 368,973 | Rouget | Aug. 30, 1887 |
| 499,495 | Baker | June 13, 1893 |
| 1,145,020 | Hill | July 6, 1915 |
| 2,775,404 | Lahr | Dec. 25, 1956 |